Figure 1:
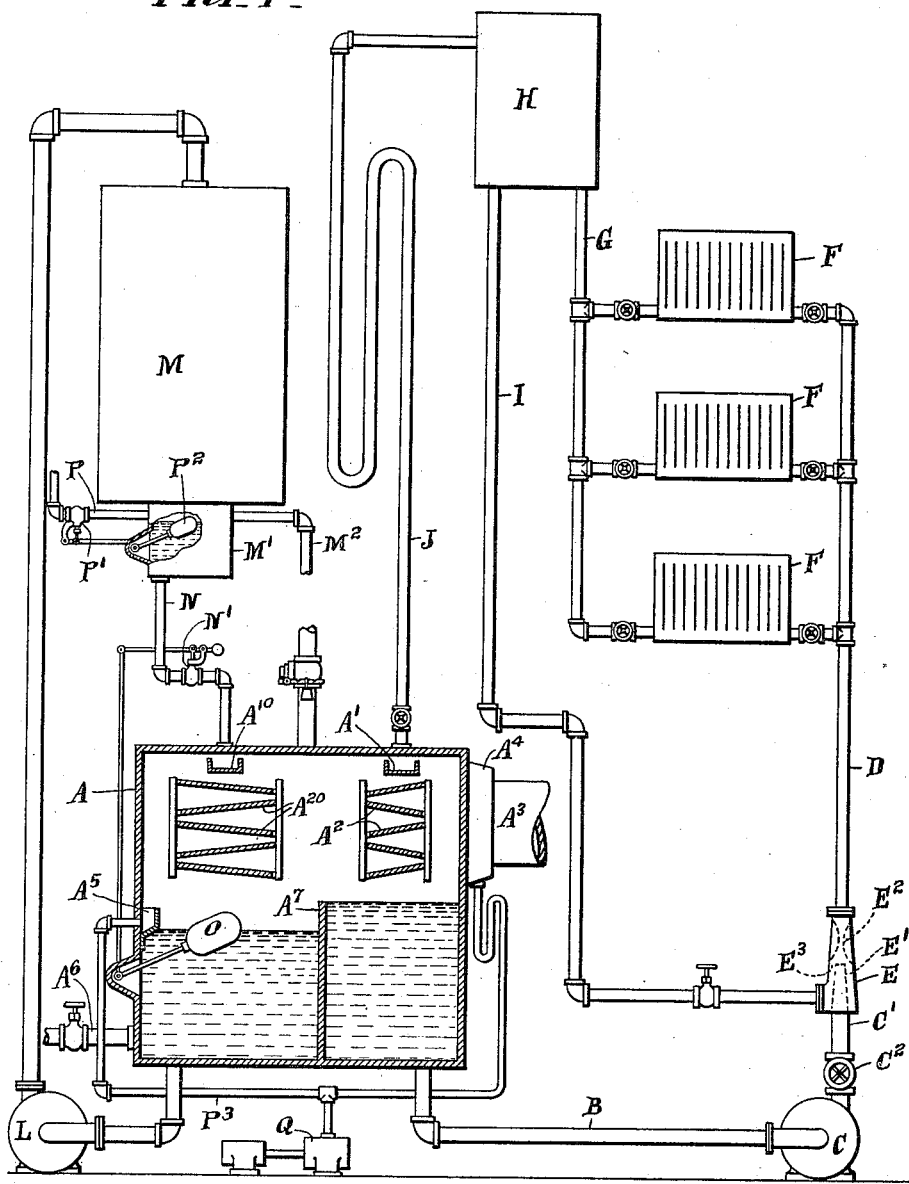

G. H. GIBSON.
HOT WATER HEATING SYSTEM.
APPLICATION FILED SEPT. 22, 1913.

1,141,955.

Patented June 8, 1915.
3 SHEETS—SHEET 1.

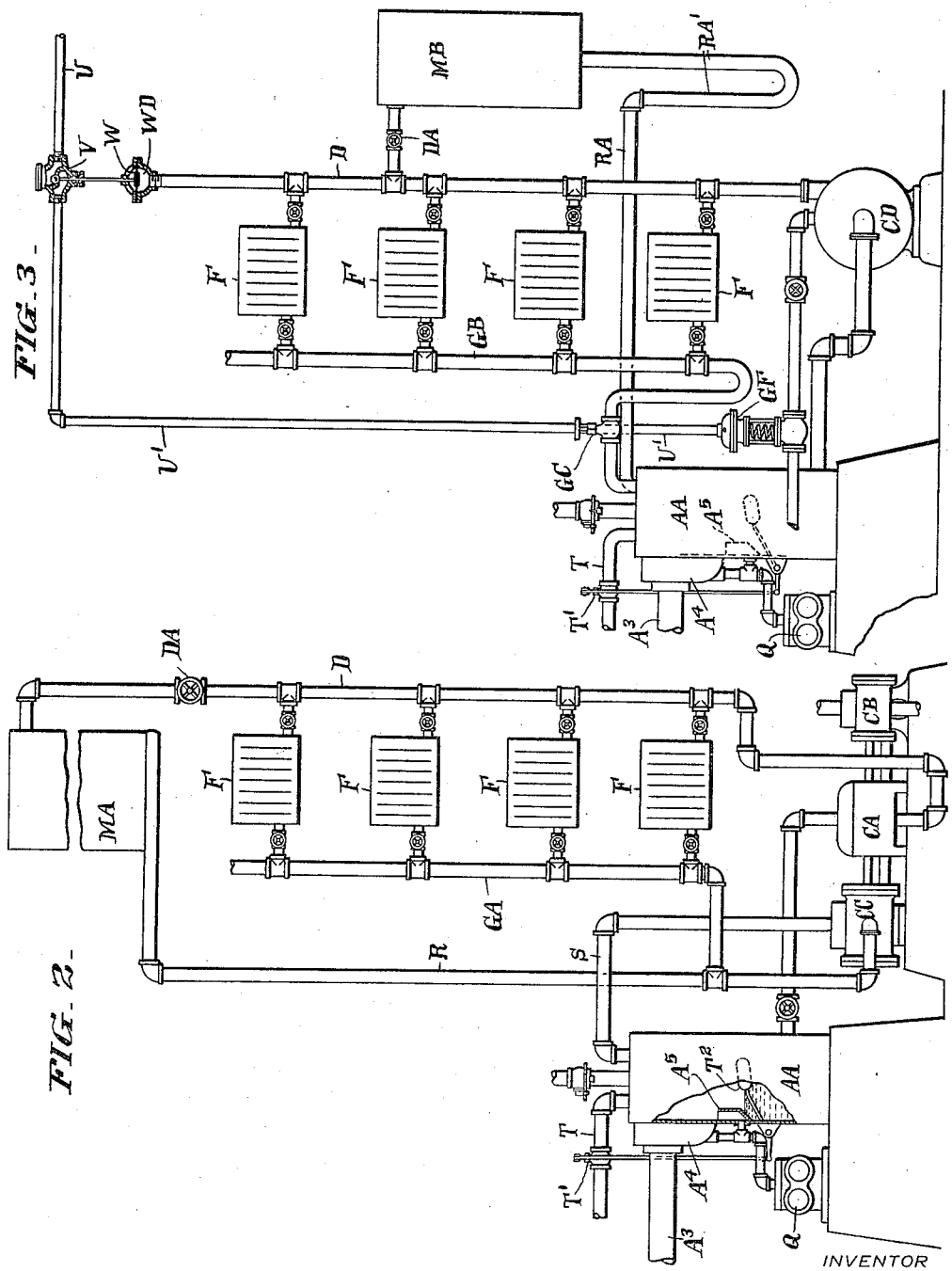

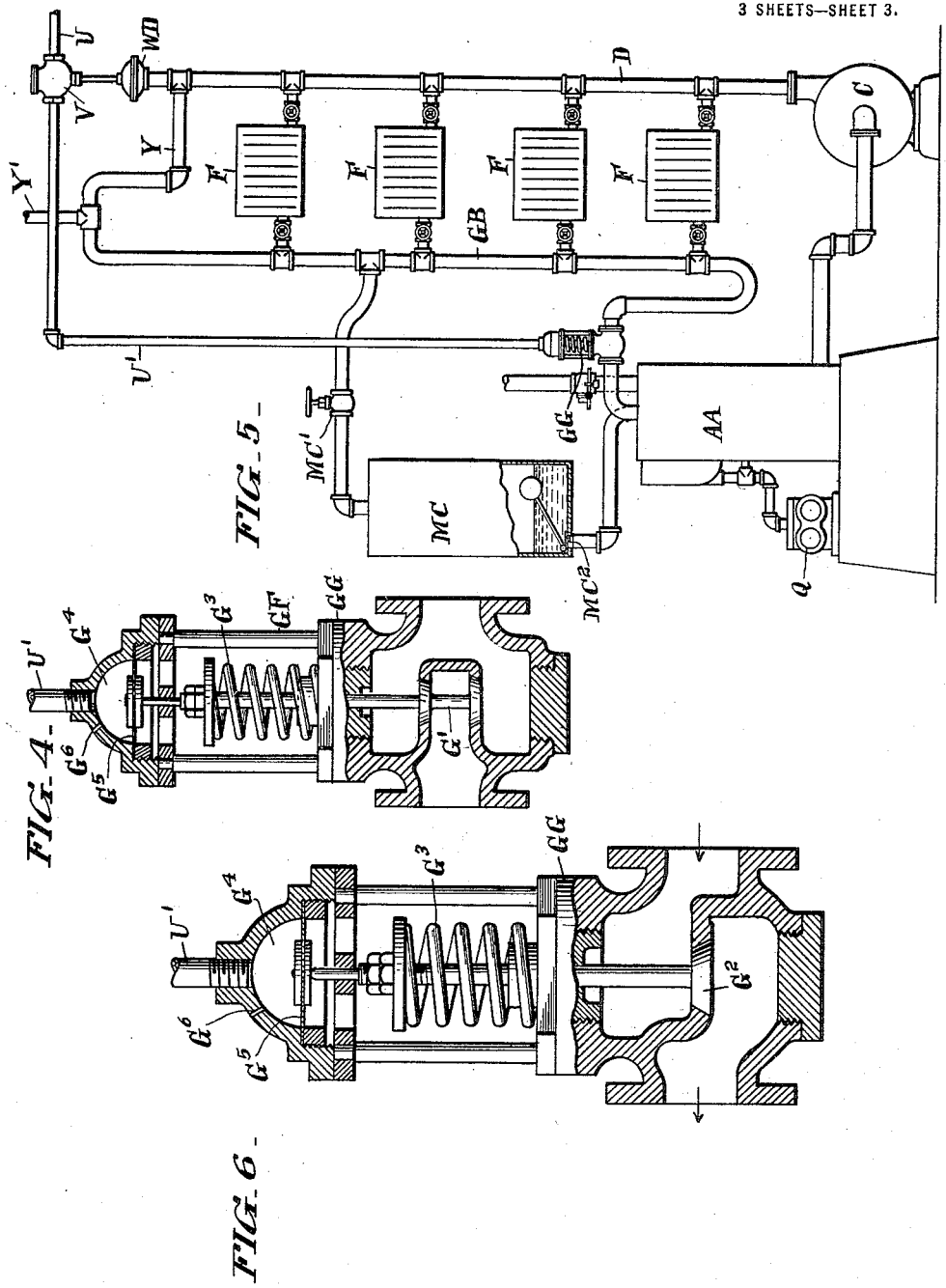

UNITED STATES PATENT OFFICE.

GEORGE H. GIBSON, OF MONTCLAIR, NEW JERSEY.

HOT-WATER HEATING SYSTEM.

1,141,955.

Specification of Letters Patent.

Patented June 8, 1915.

Application filed September 22, 1913. Serial No. 791,002.

*To all whom it may concern:*

Be it known that I, GEORGE H. GIBSON, a citizen of the United States of America, residing in Montclair, in the county of Essex and State of New Jersey, have invented certain new and useful Improvements in Hot-Water Heating Systems, of which the following is a true and exact description, reference being had to the accompanying drawings, which form a part thereof.

My present invention relates to heating systems in which the circulating medium is hot water.

The general object of the invention is the production of a simple, reliable and effective heating system, in which an open heater like the well known open feed water heaters for heating boiler feed water, or the like, may be advantageously employed for heating the water circulated through the system.

More specifically, the object of the invention is to provide simple and effective means whereby the heater which supplies hot water to the hot water circulating system may also serve effectively as a condenser for condensing steam supplied to the heater in excess of the amount required to heat up the water for the heating system, and whereby, also, the temperature of the water supplied by the heater to the heating system may be varied, and a vacuum may be maintained in the heater corresponding to the temperature at which it is desired to deliver the water from the heater to the heating system.

The various features of novelty which characterize my invention are pointed out with particularity in the claims annexed to and forming a part of this specification.

For a better understanding of the invention, however, and of the advantages possessed by it, reference should be had to the accompanying drawings and descriptive matter in which I have illustrated and described forms in which my invention may be embodied.

Of the drawings: Figure 1 is a diagrammatic elevation, partly in section, of one form of apparatus embodying my invention; Fig. 2 is a diagrammatic elevation, partly in section, of a modified form of apparatus embodying my invention; Fig. 3 is a diagrammatic elevation, partly in section, of a third form of apparatus embodying my invention; Fig. 4 is a sectional elevation of one of the valves shown in Fig. 3; Fig. 5 is a diagrammatic elevation, partly in section, of another form of apparatus embodying my invention; and Fig. 6 is a sectional elevation of one of the valves shown in Fig. 5.

In the drawings, and referring first to the construction shown in Fig. 1, A represents an open feed water heater from which hot water is drawn to supply the hot water heating system through the pipe B by the centrifugal pump C. The pump C discharges the water drawn from the heater through the check or non-return valve $C^2$ and pipe $C'$ into the circulating system proper. This system, as somewhat conventionally illustrated in Fig. 1, comprises a riser pipe D, a pipe G leading to the expansion tank H, a plurality of radiators F connected in the usual manner between the pipes D and G, a return pipe I from the expansion tank H, and an inspirator E to which the pipes $C'$, D and I are connected. The pipe $C'$ is connected to the expansion nozzle $E'$, the pipe D to the compression nozzle $E^2$, and the pipe I to the inlet or suction chamber $E^3$ of the inspirator E.

With the arrangement described, the total volume of flow through the pipes D, G and I will necessarily be somewhat greater than, and, indeed, may be several times that of the volume of flow through the pipes B and $C'$. The rate at which hot water is supplied to the circulating system, and thereby the temperature in and the heating effect of the latter may obviously be regulated, as by varying the speed of the pump or otherwise varying its effective capacity.

The mode of operation and advantageous characteristic of the circulating system proper just described are explained in detail in my copending application Serial No. 791,003 filed of even date herewith. Various novel features of the apparatus, disclosed in Fig. 1 but not specifically claimed herein, are claimed in said copending application.

It will be apparent of course that since water is constantly being fed into the circulating system proper from the heater by the pump C, a corresponding amount of water must be removed from the circulating system. This is accomplished in the apparatus shown in Fig. 1 by means of the overflow pipe J leading from the expansion tank H back to the heater A, wherein it discharges into the trough $A'$, overflowing from the latter onto the usual splash trays $A^2$.

The heater A is supplied with steam through the pipe $A^3$ and oil separator $A^4$, and is provided with an overflow connection $A^5$ limiting the height of water level in the heater, and with float actuated means for supplying make up water to maintain a minimum height of water level in the heater. In the respects just noted the heater A does not differ in principle from the ordinary open feed water heater long known and in common use. The heater has certain special provisions and adjuncts, however, to adapt it for use in carrying out the second object stated above; i. e., to enable it to serve as a condenser for condensing steam which may be supplied to it by the pipe $A^3$ in amount substantially in excess of that required to heat the water supplied to the hot water heating system or otherwise withdrawn from the heater and utilized. For this purpose a pump L is provided for drawing water from the heater and forcing it into a cooling tower M, from the cold well M' of which the water is returned through the pipe N to the heater. The water thus returned to the heater is discharged into a trough $A^{10}$ overflowing onto splash trays $A^{20}$. The rate at which the water is returned to the heater is automatically controlled by a valve N' in the pipe N and a float O responsive to the water level in the heater, or in one compartment thereof as hereinafter explained. The valve N' is automatically opened and closed by the float O as the water level in the heater or heater compartment falls below and rises to a predetermined height which is below the level of overflow into the connection $A^5$. The cold well M' of the cooling tower M is provided with an overflow pipe $M^2$, and excess water accumulating in the system may be discharged by this pipe as well as through the heater overflow $A^5$. A supply pipe P containing a valve P' supplies make up water when necessary to maintain the proper amount of water in the cold well. The valve P' is automatically actuated by a float $P^2$ which opens and closes the valve P' as the water level in the cold well M' of the cooling tower falls below and rises to a predetermined height. In general, it will be understood that the system, in so far as already described, tends to constantly gain water by condensation of the steam passing into the heater through the pipe $A^3$. It is necessary, however, to make up for some leakage from the hot water heating system proper, and for an evaporation and spray loss in the cooling tower when used, which will ordinarily be greater than the leakage loss in the circulating system proper. Moreover, the heater may supply hot water, as through the pipe $A^6$ for other purposes, and the make up supply pipe P is thus generally necessary.

I prefer to divide the water space in the heater A into two compartments as by the partition $A^7$ which projects above the water level which it is desired to maintain in the water space to the left of the partition in which the float O is located. The water from the trays $A^2$ and $A^{20}$ passes to the compartments at the right and left, respectively, of the partition $A^7$. Inasmuch as the leakage in the heating system proper under normal conditions will be less than the water of condensation passing into the compartment at the right of the partition $A^7$, the water level at the right of the partition $A^7$ will normally be maintained at the top of the partition $A^7$, and water will constantly flow over the partition to the water space at the left hand side thereof. This insures a constant head of water at the inlet of the pump C. Advantageously, the steam admission to the heater is located adjacent the splash trays $A^2$, as this permits the water passing through the pump C to be properly heated even though the available supply of steam may be insufficient to correspondingly heat water which may be passed over the trays $A^{20}$. A vacuum pump Q connected to the heater, makes it possible to maintain a vacuum, or pressure less than the atmosphere, in the heater. As shown, the vacuum pump Q is connected by the piping $P^3$ to the overflow connection $A^5$ and separator $A^4$ and serves to draw off water which may overflow into the overflow compartment $A^5$ and oil which may collect in the separator L, as well as the air or other non-condensable gas or vapor collecting in the heater.

With the apparatus described it will be apparent that the temperature maintained in the heater A and its condensing capacity may be varied by varying the rate at which the pump L draws water from the heater and passes it through the cooling tower M, for the condensing capacity of the heater varies directly, and the temperature maintained therein tends to vary inversely with the amount of cold water returned to the heater from the cooling tower.

Instead of employing separate pumps for the hot water circulating system proper and for the cooling tower operating in conjunction therewith, a single pump may be employed for both purposes, as shown for instance in Fig. 2.

In the arrangement shown in Fig. 2, water is withdrawn from the heater AA by the reciprocating pump CA, the piston of the pump CA being connected to and operated by pistons working in the steam cylinder CB and in the water motor cylinder CC. The water outlet from the pump cylinder CA is directly connected to the riser D, and the latter is connected at its upper end to a cooling tower MA. The flow of water into the cooling tower from the riser D is controlled by a throttle valve DA which may be adjusted to vary the flow therethrough to the cooling tower as desired. The return pipe GA from the radiators and the return pipe R from the cooling tower lead to the inlet port of the motor cylinder CC. The outlet port from this cylinder is connected by a pipe S to the top of the heater AA, discharging onto the splash trays in the latter. Make up water is supplied to the heater AA as required through the cold water supply pipe T which contains the flow regulating valve T' operated by the float $T^2$ in the heater in response to variations in the water level in the latter.

$A^3$ represents the steam supply pipe to the heater, $A^4$ the oil separator, $A^5$ the overflow connection, and Q the pump for regulating the vacuum in the heater.

With the apparatus shown in Fig. 2, the condensing effect of the heater AA may obviously be varied within wide limits by adjusting the valve DA to cause more or less of the water withdrawn from the heater by the pump CA to flow through the cooling tower MA. The available head of the water passing toward the pump through the pipes R and GA is to a large extent utilized and not lost as the water passes through the motor cylinder CC in which the energy available in the water is utilized.

In Fig. 3 I have illustrated a system in which the cooling tower is connected with the heating system proper generally as in Fig. 2. The system shown in Fig. 3 differs in a number of respects, however, from that shown in Fig. 2. As shown, the pump CD employed for drawing water from the heater and delivering it to the riser D is a centrifugal pump, though it is immaterial whether a centrifugal or reciprocating pump is employed. The return pipe RA from the cooling tower MB leads directly to the heater, although preferably formed with a water seal loop RA' as shown, to prevent free steam communication between the heater and cooling tower. The return pipe GB from the radiators F is connected to the heater through a seal loop and hand valve GC. In the arrangement shown in Fig. 3 the pump CD is automatically controlled so as to supply water rapidly enough to insure that the uppermost radiator or radiators is kept full of water, under all conditions, without raising the pressure of the water at the top of the circulating system higher than is necessary. This is accomplished in the form shown by the drawings by making the valve GF which controls the supply of steam to the motor driving the pump CD automatically responsive to the pressure at the top of the circulating system. The valve GF, as shown, (see Fig. 4) comprises a balanced valve member G' acted upon by a spring $G^3$ tending to hold the valve open. The means shown in Figs. 3 and 4 for overcoming the tension of the spring $G^3$ and moving the valve member G' toward its seat more or less as required, comprises a pressure chamber $G^4$ attached to the casing of the valve GG and having a portion of its wall formed by a flexible diaphragm $G^5$ engaging the stem of the valve member G'; and also comprises means, responsive to the pressure at the top of the circulating system, for admitting a pressure fluid to the pressure chamber $G^4$. In the arrangement shown in Fig. 3 the pressure fluid thus admitted to the chamber $G^4$ is compressed air supplied by a pipe U through a valve V and pipe U'. The valve V is automatically actuated in response to the pressure at the top of the circulating system by the diaphragm W forming a part of the pressure chamber WD connected to the top of the riser D. When the pressure at the top of the circulating system rises above the desired amount, the diaphragm W is operative to open the valve V and thus permit pressure fluid to flow from the pipe U through the pipe U' to the chamber $G^4$ where it acts on the valve member G' in a direction tending to move the valve toward its seat against the tension of the spring $G^3$.

$G^6$ represents a restricted leakage port from the chamber $G^4$ permitting the escape of the pressure fluid and a consequent reduction in the pressure in the chamber $G^4$ when the valve V is closed. With the arrangement described the pump CD will be operated at the required speed to maintain the desired pressure against the diaphragm W regardless of the extent to which the flow through the radiators is reduced by closing or throttling the radiator valves. The cooling tower MB should be located at a high enough level so that it will drain freely into the heater, but advantageously is not located higher than this level, for when no water is flowing through the radiators and the throttle valve DA is wide open the only work required from the pump CD is to pump the water which it may then be necessary to pass through the cooling tower to the level of the top of the latter.

In the forms of apparatus shown in Figs. 1, 2 and 3, the cooling tower is connected in parallel, so to speak, with the hot water circulating system proper. In some cases, however, it may be desirable to place the cooling tower in series with the hot water circulating system proper, and one arrangement of this kind is shown in Fig. 5, wherein the cooling tower MC and valve MC' are connected between the return pipe GB and the heater in shunt, so to speak, to a throttle valve GG controlling direct communication between the heater and return pipe GB. In this form of apparatus the riser D and return pipe GB are preferably connected by a by-pass pipe Y which comprises a portion located about the top of the circulating system proper and permits of the circulation of the cooling water when the radiators are nearly or entirely closed off. Y' represents a vent from the highest portion of the pipe provided to prevent a siphon flow through pipe Y. MC² represents a float actuated valve controlling the flow out of the cooling tower MC into the heater and serving to maintain sufficient water in the cooling tower to prevent steam from blowing out of the heater through the tower. The valve GG is automatically actuated to maintain a head of water in the return pipe GB sufficient to insure that the uppermost radiator or radiators are under all operating conditions kept full of water. The throttle valve GG may be, and is shown as being similar to the valve GF of Fig. 4 except that the movable valve member G² replacing the valve member G' of Fig. 4 is not balanced but is urged away from its seat by the pressure of the water admitted to the valve casing by the return pipe GB. The spring G³ of the valve GG might be so adjusted as to hold the valve closed, except when the pressure on the inlet side of the valve disk is equal to or exceeds the head of water due to the difference in level between the top of the circulating system and the valve. With the spring so adjusted it would of itself so control the operation of the valve as to keep the radiators always filled with water, and on the other hand would open to limit the maximum pressure in the circulating system, and to permit the return of water to the heater. With this simple spring control of the valve G², however, the delivery pressure against which the pump CD must work will be unnecessarily high when conditions require a maximum amount of water to be pumped through the radiators, for at such a time there will be a considerable loss of head due to the frictional resistance to the flow of water through the radiators and return pipes, and to insure the opening of the valve GG under this condition, the pressure at the top of the circulating system must be sufficient to compensate for the loss of head resulting from the frictional resistance to the flow of water back to the heater. This results in substantially increasing the load on the circulating pump at the time the pump is already working under heavy load. This disadvantage is obviated by providing means for automatically varying or counteracting the effective tension of the spring G³ as required to prevent an unnecessary increase in pressure at the top of the circulating system. The means shown in Fig. 5 for neutralizing the effect of the spring G³ more or less as required comprise parts U, U', V, and WD, operating as in the arrangement shown in Fig. 3.

While in accordance with the provisions of the statutes I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent, is:

1. In combination an open water heater comprising a heating chamber, a steam supply connection to said chamber, a hot water circulating, heat radiating system connected to and receiving hot water from and returning cold water to said chamber, a cooling tower, and regulable means for passing water from said chamber into said cooling tower and returning it to said chamber whereby the temperature of the water delivered by the heater to the heating system and the steam condensing capacity of the heater may be varied by varying the rate at which water is passed to the cooling tower and returned to said chamber.

2. In combination, an open water heater comprising a heating chamber, a steam supply connection to said chamber, a hot water circulating, heat radiating system connected to and receiving hot water from and returning cold water to said chamber, a vacuum pump connected to said chamber, a cooling tower, and regulable means for passing water from said chamber into said cooling tower and returning it to said chamber whereby the temperature of the water delivered by the heater to the heating system and the steam condensing capacity of the heater may be varied by varying the rate at which water is passed to the cooling tower and returned to said chamber.

3. In combination an open water heater comprising a heating chamber, a steam supply connection to said heating chamber, a hot water circulating, heat radiating system, a cooling tower, means for withdrawing water from said heater and delivering it in regulable proportions to said heating system and to said cooling tower, and for returning water from the heating system and tower to said heater whereby the temperature of the water delivered by the heater to the heating system and the steam condensing capacity of the heater may be varied by varying the rate at which water is passed to the cooling tower and returned therefrom to said chamber.

4. In combination, an open water heater comprising a heating chamber, a steam supply connection to said chamber, a hot water circulating, heat radiating system connected to and receiving hot water from and returning cold water to said chamber, a cooling tower, a common pump for withdrawing water from said chamber and delivering it to said heating system and cooling tower, and regulable means for varying the amount of water passing through the cooling tower and means for returning water to said chamber from said tower and system.

5. In combination, an open water heater comprising a heating chamber, a steam supply connection to said heating chamber, a hot water circulating, heat radiating system including a circulating pump and radiators receiving water from and discharging back into said heating chamber, a cooling tower receiving the water from said circulating system at the supply side of the radiators and returning water to said heating chamber, and valved means for regulating the amount of water passing through said cooling tower.

GEORGE H. GIBSON.

Witnesses:
NORMAN K. CONDERMAN,
ROBERT G. CLIFTON.

Copies of this patent may be obtained for five cents each, by addressing the "Commissioner of Patents, Washington, D. C."